United States Patent
Cancro et al.

(10) Patent No.: US 9,508,099 B2
(45) Date of Patent: Nov. 29, 2016

(54) DOUBLE TAP AND DONE

(71) Applicant: Wal-Mart Stores, Inc., Bentonville, AR (US)

(72) Inventors: Richard Neil Cancro, Portland, OR (US); Douglas James Pedley, Portland, OR (US); Joel Bennett Acker Jr., Brush Prairie, WA (US)

(73) Assignee: WAL-MART STORES, INC., Bentonville, AR (US)

( * ) Notice: Subject to any disclaimer, the term of this patent is extended or adjusted under 35 U.S.C. 154(b) by 356 days.

(21) Appl. No.: 13/754,754

(22) Filed: Jan. 30, 2013

(65) Prior Publication Data
US 2014/0214619 A1   Jul. 31, 2014

(51) Int. Cl.
  G06Q 30/00  (2012.01)
  G06Q 30/06  (2012.01)

(52) U.S. Cl.
  CPC ...... G06Q 30/0641 (2013.01); G06Q 30/0633 (2013.01); *G06Q 30/0623* (2013.01)

(58) Field of Classification Search
  CPC .................................. G06Q 30/0601–30/0645
  USPC ................................................ 705/26.1–27.2
  See application file for complete search history.

(56) References Cited

U.S. PATENT DOCUMENTS

| | | | |
|---|---|---|---|
| 6,587,835 B1 | 7/2003 | Treyz | |
| 7,580,699 B1 | 8/2009 | Shaw | |
| 8,239,276 B2 | 8/2012 | Lin | |
| 8,239,286 B2 | 8/2012 | Davis | |
| 2003/0200156 A1* | 10/2003 | Roseman | G06Q 30/02 705/26.44 |
| 2010/0082447 A1* | 4/2010 | Lin | G06Q 30/0601 705/26.1 |
| 2013/0332318 A1* | 12/2013 | D'Auria | G06Q 30/0241 705/27.1 |

FOREIGN PATENT DOCUMENTS

| | | |
|---|---|---|
| EP | 1952265 | 8/2008 |
| EP | 1794707 | 7/2009 |

OTHER PUBLICATIONS

Communications of the ACM—Mobile computing opportunities and challenges. vol. 46 Issue 12, Dec. 2003. pp. 48-52. Publication Date: Dec. 1, 2003. Publisher: ACM New York, NY, USA. ISSN: 0001-0782 EISSN: 1557-7317 doi>10.1145/953460.953487.*

* cited by examiner

*Primary Examiner* — Resha Desai
(74) *Attorney, Agent, or Firm* — Howard & Howard Attorneys PLLC

(57) ABSTRACT

A computer-implemented method for using a mobile computing device corresponding to a user to purchase a product being offered for sale by a user includes, when the mobile computing device has selected an item indicating the product, obtaining item information related to the item. Item display data is generated based on the item information and transmitted to the mobile computing device. The item display data prompts the mobile computing device to display the item information and an operational input in a graphical user interface of the mobile computing device. A command is received in response to a prescribed number of actions input by the user to the operational input. The command causes a purchasing server to perform one or more operations.

20 Claims, 7 Drawing Sheets

DOUBLE TAP AND DONE

BACKGROUND INFORMATION

Field of the Disclosure

The present invention relates generally to methods for using a mobile computing device to purchase a product being offered for sale by a retailer. In particular, examples of the present invention are related to techniques for displaying an operational input and item information related to a selected item in a graphical user interface of the mobile computing device and performing one or more operations in response to a prescribed number of actions input by a user to the object input.

Background

Modern technology offers today's consumers a wide range of tools for interacting in the marketplace. Using mobile computing devices, e.g., smart phones or tablets, consumers have access to a wide range of information and a broad array of shopping tools for purchasing anything from electronic devices to simple groceries from retailers. The consumer may select various items intended to be purchased using the mobile computing device.

It is known, for example, to display a graphical element comprising an operational input upon the mobile computing device that allows the consumer to add the item to an electronic shopping cart corresponding to the user. One drawback of adding the item to the electronic shopping cart is that the consumer must undertake a navigation process of selecting additional graphical elements leading to additional screens displayed upon the mobile computing device to view the electronic shopping cart. Then, the consumer may be prompted for additional information to complete the ordering of the items from the retailer. Hence, despite the wide range of tools and information available, the consumer must navigate through multiple screens through various operational inputs to purchase an item.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
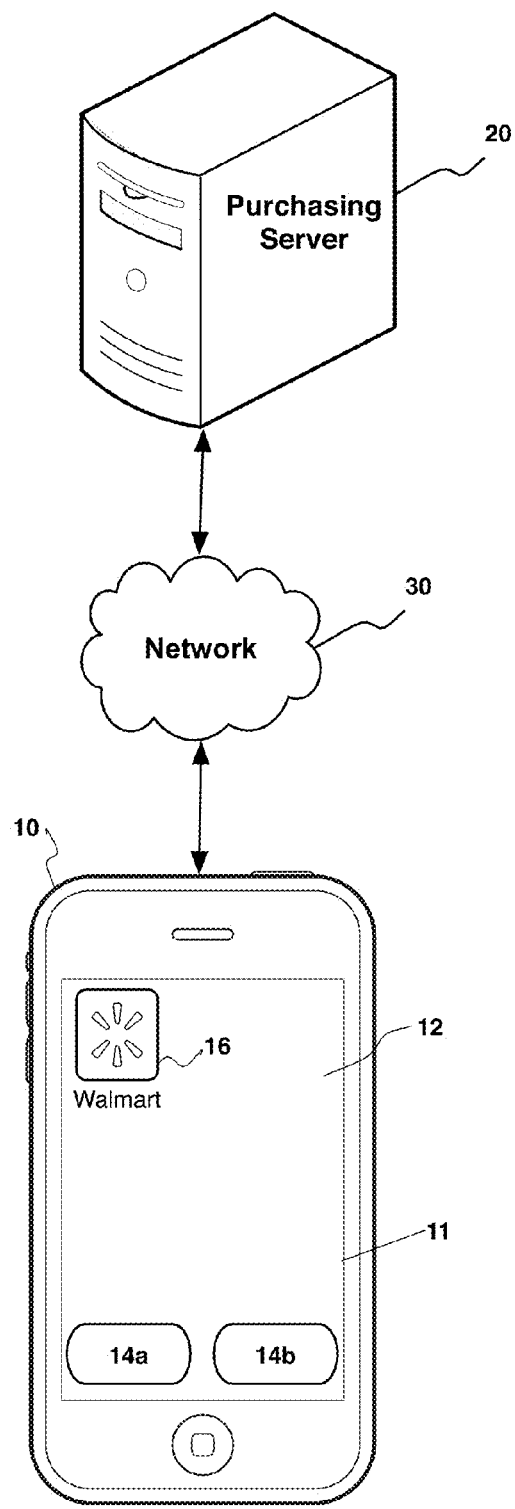
FIG. 1 schematically illustrates a purchasing server in communication with a mobile computing device displaying a graphical user interface in accordance with the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. Techniques for adding a selected item to an electronic shopping cart and/or purchasing the selected item in response to a prescribed number of actions input by a user to an object input displayed in a graphical user interface of a mobile computing device are described herein. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

It may be desirable to allow users to use the capabilities of their mobile computing devices to purchase products being offered for sale by a retailer. The term "product" can refer to groceries, foods, office supplies, clothing wares, or any other fungible goods sold by the retailer. Displaying item information related to a product and commanding a purchasing server to perform one or more operations related to purchasing the item in response to a prescribed number of actions input by the user to a displayed operational input, are described herein. The term "user" can refer to a potential consumer, customer or shopper at the retailer.

Some users utilize the capabilities of their mobile computing devices to obtain and view information. For example, a user may obtain item display data transmitted from a purchasing server of the retailer when the user has selected an item using the mobile computing device. As used herein, the term "mobile computing device" can refer to mobile telephones, laptop computers, and tablet computers. The item display data can prompt the mobile computing device to display item information and an operational input in a graphical user interface (GUI) of the mobile computing device. The item information is related to the item selected by the mobile computing device and the operational input may display information related to an inquiry requested by the retailer. As used herein, the term "item" can refer to any type of indicator of a product sold by a retailer. The user can input a prescribed number of actions to the operational input causing the purchasing server to perform one or more operations related to purchasing the item for the user.

In accordance with various embodiments of the present disclosure, techniques are described for detecting when a mobile computing device has selected an item indicating a product being offered for sale by a retailer. For instance, a user may browse an electronic catalog listing one or more items being offered for sale, the electronic catalog being furnished by the retailer for display in the GUI of the mobile computing device. The user may select one or more of the displayed items listed in the electronic catalog. Similarly, the user may browse a list of previously selected items by the mobile computing device, and thereafter select the item from the previously selected list. In other embodiments, the mobile computing device may select the item when the user is present within a facility furnished by the retailer. The term "facility" can refer to shopping venues, complexes and department stores. For instance, the mobile computing device may scan a barcode corresponding to the product at a currently stocked location within the facility using a camera device. In another instance, the mobile computing device may communicate with a near field communication device corresponding to the product at the currently stocked location using a near field communication interface. Likewise, if scanning a barcode or communicating with near field communication is not feasible, the mobile computing device can receive a user input that includes manually entering the item into the mobile computing device, e.g., the user enters a universal product code corresponding to the item.

Furthermore, techniques are described for generating item display data based on obtained item information related to the item. The item information can be obtained by receiving an item identifier broadcasted from the mobile computing device when the item has been selected and retrieving the item information from an item database using the item identifier, wherein the item database stores item information for a plurality of items. In one embodiment, the "item information" can include pricing information chosen by the retailer and stored in the item database, the pricing information being indicative of a cost to purchase the selected item. In another embodiment, the "item information" can include description information being indicative of one or more of physical attributes, specifications, and promotions offered by the retailer and related to the selected item. In yet another embodiment, the "item information" can include availability information being indicative of availability of the item at one or more nearby facilities and/or facilities preferred by the user. Further, the "item information" can include consumer information being indicative of reviews and ratings of the item submitted by other users who purchased the item.

Techniques are further described for transmitting the generated item display data to the mobile computing device. Generating and transmitting the item display data is performed at a processing device of a purchasing server furnished by the facility. The item display data prompts the mobile computing device to display the item information and an operational input in the GUI of the mobile computing device. As used herein, the term "operational input" refers to an interactive graphic or graphical element displaying information related to an inquiry requested by the retailer and configured to receive a prescribed number of actions input by the user to command the purchasing server to perform one or more operations.

Techniques are further described for displaying the operational input at a predefined location in the GUI, wherein the operational input remains at the predefined location in response to a single-action user input and a double-action user input to the operational input. In one embodiment, the single-action user input commands the purchasing server to add the item to an electronic shopping cart corresponding to the user. In another embodiment, the double-action user input commands the purchasing server to provide obtained purchasing information to the mobile computing device, e.g., the mobile computing device displays shipping information and payment corresponding to the user in addition to the operational input. The purchasing information can be obtained by receiving a user identifier broadcasted from the mobile computing device in response to the double-action user input, wherein the purchasing information is retrieved from a user database using the user identifier. The user database may store purchasing information for a plurality of users. In yet another embodiment, a triple-action input commands the purchasing server to complete an order to purchase item for the user. Thus, one graphical element including the operational input remains displayed at the predefined location in the GUI, and can be utilized to add the item to the electronic shopping cart, provide purchasing information to the mobile computing device, and complete the order for the purchase of the item based on the prescribed number of actions input by the user.

FIG. 1 illustrates a mobile computing device 10 in communication with a purchasing server via network 30. While one purchasing server 20 is illustrated, the term "purchasing server" refers to one or more servers that operate in an individual or distributed manner. As used herein, the term "network" can refer to any communication network including, but not limited to, a wireless network, a cellular network, an intranet, the Internet, or combinations thereof. In the illustrated example, the mobile computing device 10 is displaying a graphical user interface (GUI) 12 on a touch screen 11 of the mobile computing device 10. While a touch screen 11 is illustrated, it should be appreciated that other user interfaces can be used to allow a user to interact with the mobile computing device 10.

The GUI 12 allows a user to interact with the mobile computing device 10. The GUI 12 may display at least one operational input, e.g., push buttons 14a and 14b, that allows the user to provide a command to the purchasing server 20, the command causing the purchasing server 20 to perform one or more operations. The GUI 12 may additionally display at least one graphical element, shown here as icon 16, that may be selected via the touch screen 11. Graphical elements, such as icon 16, may represent various layers, windows, screens, templates, elements, or other components that may be displayed in some or all areas of the GUI 12 upon selection by the user. Furthermore, selection of a graphical element may lead to a hierarchical navigation process, such that selection of a graphical element (e.g., icon 16) leads to a screen/display that includes one or more additional graphical elements. A textual indicator, e.g., "Walmart", may be displayed on or near the icon 16 to facilitate user interpretation of each graphical element. It should be appreciated that the GUI 12 may include various components arranged in hierarchical and/or non-hierarchical structures.

When a graphical element, e.g., icon 16, is selected, the device 10 may be configured to open an application associated with that element and display a corresponding screen. For example, when icon 16 is selected, the device may open a shopping program and display a shopping menu displaying various tools and features available in the shopping program. For each application, screens may be displayed on the GUI 12 that include various user interface elements.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The purchasing server 20 may include a processing device that detects when the mobile computing device 10 has selected an item indicating a product being offered for sale by a retailer. When the mobile computing device has selected the item, the processing device can obtain item information related to the item, generate item display data based on the item information and transmit the item display data to the mobile computing device 10. When the item display data is received, the mobile computing device 10 is prompted to display the item information and an operational input, e.g., push button 14*b*, in the GUI 12. The item information can include any combination of pricing information, availability information, description information and consumer review information related to the item and stored in an item database. The retailer may input the item information into the item database using a retailer computing device that communicates with the purchasing server. Thereafter, the processing device of the purchasing server 20 may receive a command in response to a prescribed number of actions input by the user to the operational input, e.g., push button 14*b*, the command causing the processing device to perform at least one of: (1) add the item to an electronic shopping cart corresponding to the user in response to a single-action user input the operational input; (2) provide purchasing information to the mobile computing device 10 in response to a double-action user input to the operational input; and (3) complete an order to purchase the item for the user in response to a triple-action user input to the operational input.

Any combination of one or more computer-usable or computer-readable media may be utilized by the processing device of the purchasing server 20. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Figure 2A:
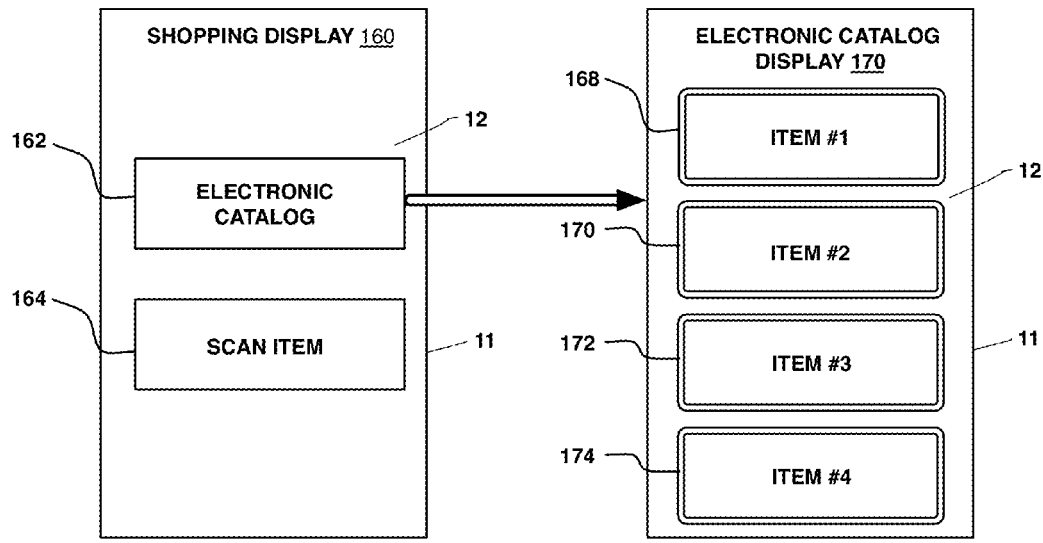
FIGS. 2A-2B schematically illustrate non-limiting examples for methods of selecting an item offered for sale by a retailer using the mobile computing device of FIG. 1.
Figure 2B:
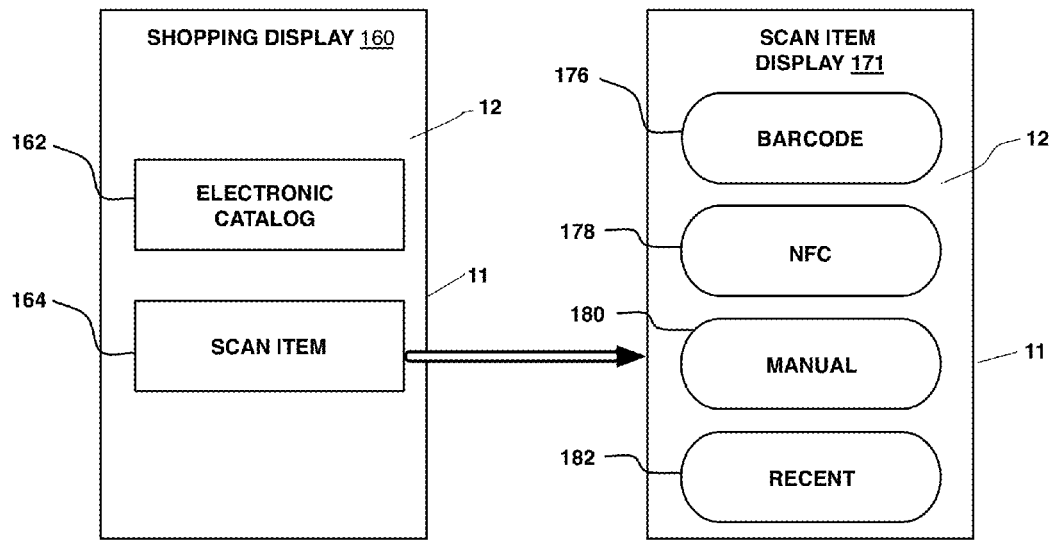

FIGS. 2A-2B schematically illustrate non-limiting examples of methods for selecting an item offered for sale by a retailer using the mobile computing device 10 of FIG. 1. Each of FIGS. 2A-2B include the GUI 12 displayed upon the touch screen 11 of the mobile computing device 10. FIG. 2A includes a screen for a shopping display 160 and a screen for an electronic catalog display 170. FIG. 2B includes the shopping display 160 and a screen for a scan item display 171. In some embodiments, selection of the graphical element including icon 16 of FIG. 1, may advance the mobile computing device 10 to the shopping display 160. The shopping display 160 serves as a gateway for selecting items a user desires to purchase.

The shopping display 160 includes graphical elements 162 and 164, e.g., buttons, which allow the user to access the feature for selecting items as indicated. Upon selection of the "Electronic Catalog" button 162, the GUI 12 may be advanced to the electronic catalog display 170. The electronic catalog display 170 allows a user to search and browse items offered for sale by the retailer. A respective graphical element or icon may correspond to each item offered for sale. As illustrated, graphical elements, e.g., buttons, 168, 170, 173 and 174 each correspond to respective items #1, #2, #3 and #4. If the user is interested in one of the items, the user may select the respective button to select the item. In one embodiment, the user touches or taps the respective button displayed upon the GUI 12. The user may search for desired items in the electronic catalog display 170 and scroll items organized by category. Accordingly, the mobile computing device receives a user input, e.g., tapping or touching, to select the item from the electronic catalog display 170 in the GUI 12.

Referring to FIG. 2B, upon selection of the "Scan Item" button 164, the GUI 12 may be advanced to the scan item display 171. The scan item display 171 provides a menu of various methods the user can utilize to select an item indicating a product offered for sale within the facility. Generally, a user will select the scan item button 164 when the user is currently shopping within a facility of the retailer and is interested in one or more products offered for sale within the facility. The scan item display 171, includes graphical elements, e.g., buttons 176, 178, 180 and 182 that each correspond to tools for selecting the item offered for sale. Upon selection of "Barcode" button 176, the user may scan a barcode corresponding to the product indicated by the item at a currently stocked location within the facility. For instance, a camera device of the device 10 may be used to capture an image of the barcode, which may be processed by the device 10 to extract an encoded item identifier corresponding to the item. In an exemplary embodiment, the GUI 12 may be advanced to a camera display for operating the camera when the Barcode button 176 is selected. Dedicated software can be additionally used so that the camera device functions as a barcode scanner, wherein a success indicator can be displayed upon the GUI 12 while scanning the barcode.

Upon selection of "NFC" button 178, the user may utilize a near field communication (NFC) interface of the mobile computing device 10 to communicate with a NFC device corresponding to the product at the currently stocked location within the facility. For instance, the NFC may allow for close range communication at relatively low data rates to communicate with the NFC device such as radio frequency identification (RFID) tags or labels. In this way, the NFC interface may be used to obtain an item identifier corresponding to the item that is broadcasted from the NFC device, e.g., RFID tag, corresponding to the product. To conserve battery life, the NFC interface may be powered down when not in use. Therefore, selection of the NFC button 178 may turn on the NFC interface.

Upon selection of "Manual" button 180, the user may manually input an item identifier, e.g. a universal product code (UPC), corresponding to the product into the mobile computing device. Upon selection of the "Recent" button 182, the user may select the item from a list of previously selected items by the mobile computing device 10. In one embodiment, anytime the mobile computing device selects an item using any of the previously described methods above, the selected item is stored in a memory device. Accordingly, a list of previously selected items can be compiled and viewed by the user for selection. The memory device may correspond to the purchasing server and/or the mobile computing device.

After an item is selected through selection of one of the buttons on the electronic catalog display 170 or the scan item display 171, an item identifier is broadcasted from the mobile computing device 10 to the purchasing server 20 of FIG. 1, via network 30. The purchasing server 20 may then retrieve item information from an item database for eventual display upon the mobile computing device 10. It will be appreciated that this disclosure is not limited to any one of the methods described with reference to the non-limiting examples illustrated in FIGS. 2A-2B, and any method of selecting an item that a user intends to purchase can be utilized in the embodiments described herein.

Figure 3A:
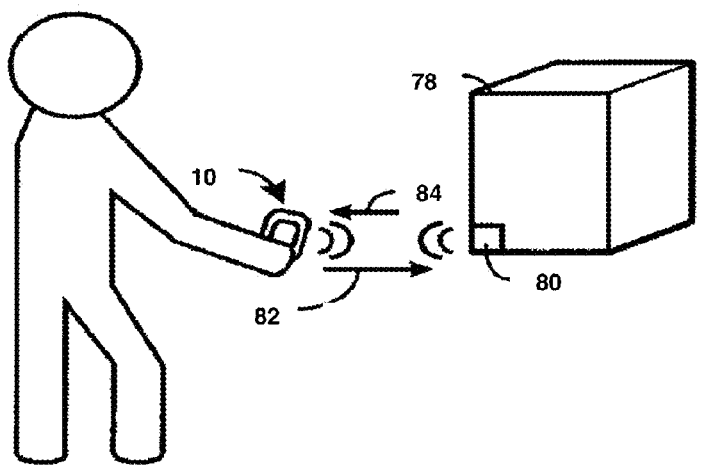
FIGS. 3A-3B schematically illustrate non-limiting examples of the mobile computing device of FIG. 1 selecting an item indicating a product currently stocked within a facility furnished by the retailer.
Figure 3B:
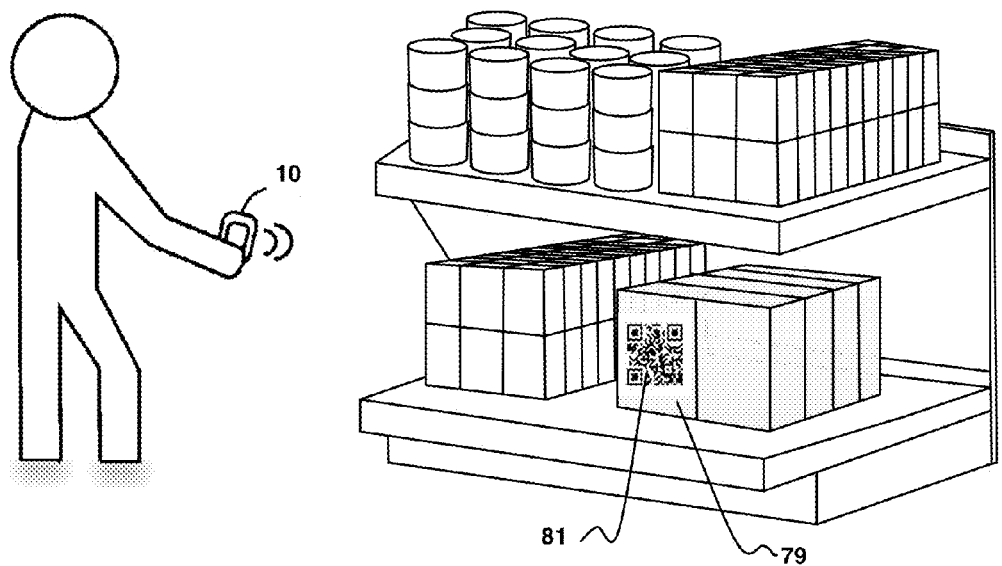

FIGS. 3A-3B schematically illustrate non-limiting examples of the mobile computing device 10 of FIG. 1 selecting an item indicating a product currently stocked within a facility furnished by the retailer. FIG. 3A illustrates near field communication between mobile computing device 10 and a currently stocked product 78 indicated by the item. FIG. 3A illustrates a scenario when button 178 of the scan item display 171 is selected in FIG. 2B. The user of the mobile computing device 10 may obtain item information related to the product 10. In some embodiments, the product 78 may be NFC enabled so that the mobile computing device 10 may acquire an item identifier from the product 78 through NFC communications. As such, the product 78 may include an NFC device 80 such as an RFID tag or label, which may be passive or active and may be included in the product packaging or the product itself. The NFC device 80 may contain information that can be used to identify the product, such as a UPC, model number, serial number, a product name, product description, etc. The NFC interface 50 may send an output signal 82 to the NFC device 80. The output signal 82 powers the NFC device 80 and triggers the NFC device 80 to transmit a return signal which is received by the NFC interface 50. The return signal 84 includes the item identifier and may additionally include other relevant information, such as an item description or a media file, depending on the capacity to the NFC device 80.

FIG. 3B illustrates the mobile computing device 10 scanning a barcode 81 corresponding to product 71 indicated by the item. FIG. 3B illustrates a scenario when button 176 is selected from the scan item display 171 of FIG. 2B. The product 71 is currently stocked at a location, e.g., a shelf, within the facility furnished by the retailer. Using a camera device of the mobile computing device, an image of the barcode 81 can be captured and the item identifier can be extracted therefrom. The barcode 81 can include a one-dimensional barcode or a two-dimensional, such as a quick response (QR) code illustrated in the non-limiting example. Similarly, the camera device in association with dedicated software, can function as a barcode scanner to directly extract the item identifier form the barcode 81.

Figure 4:
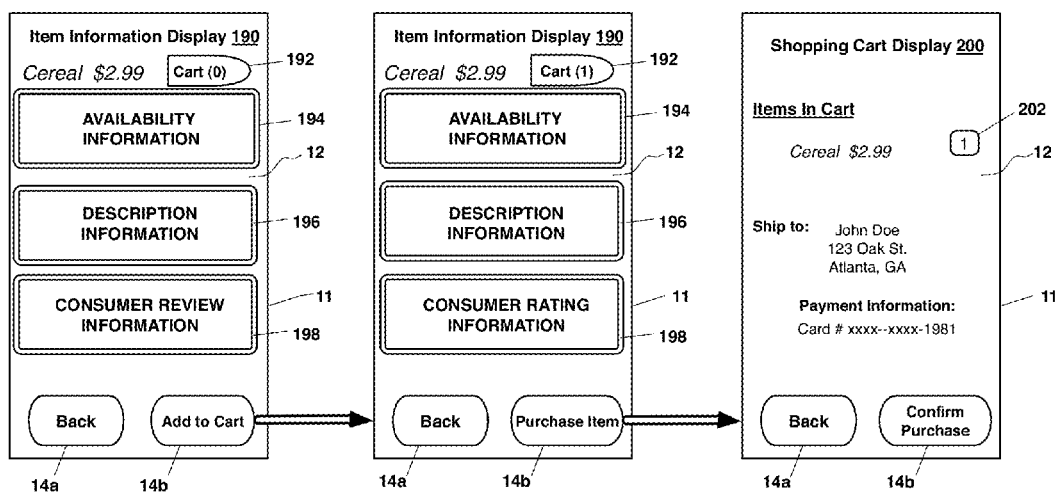
FIG. 4 schematically illustrates a non-limiting example of one or more operations performed in response to a prescribed number of actions input by the user to an operational input displayed in the graphical user interface of FIG. 1, in accordance with the present disclosure.

FIG. 4 schematically illustrates a non-limiting example of one or more operations performed related to a selected item in response to a prescribed number of actions input by the user to an operational input displayed in the GUI 12 of FIG. 1, in accordance with the present disclosure. FIG. 4 includes the GUI 12 displayed upon the touch screen 11 of the mobile computing device 10. As aforementioned, once the mobile computing device 10 has selected an item described in the non-limiting examples of FIGS. 2A-2B, a processing device of the purchasing server 20 obtains item information related to the item, generates display data based on the item information and transmits the item display data to the mobile computing device 10.

FIG. 4 includes a screen for an item information display 190 that is prompted by the mobile computing device 10 for display when the item display data is received from the processing device of the purchasing server 20. The item information display 190 includes a brief description and pricing information of the selected item, e.g. "Cereal $2.99". The item information display 190 includes the obtained item information and an operational input 14b. The operational input 14b is displayed at a predefined location in the GUI 12. The operational input 14b displays information related to an inquiry requested by the retailer, e.g., "Add to Cart", and includes a textual indicator to facilitate user interpretation that an action input by the user to the operational input 14b will "Add to Cart". The item information display 190 includes graphical elements, e.g., buttons, 194, 196, and 198 corresponding to availability information, description information and consumer review information, respectively. The item information display 190 further includes graphical element 192 that may advance the user to an electronic shopping cart corresponding to the user. As used herein, the term "electronic shopping cart" can refer to a list of one or more items selected by a user indicating products that the user intends to purchase. In the illustrated embodiment, the electronic shopping cart button 192 does not currently include any items, as indicated by a textual indicator displaying a "(0)". However, embodiments are envisioned where the electronic shopping cart may include one or more items previously added to the electronic shopping cart. Another operational input 14a, e.g., button, may be displayed that reverses the GUI 12 back to a previously displayed screen upon the user selecting button 14a.

The GUI 12 can be advanced to display availability of the item in one or more nearby facilities for the user to view upon a user input selecting the availability information button 194. A location of the mobile computing device can be monitored using a GPS device and tracked upon a map in relation to one or more nearby facilities. Alternatively, availability of the item can be determined for facilities explicitly preferred by the user or facilities frequently visited by the mobile computing device. Upon selection of the description information button 196, the GUI 12 can be advanced to display, for the user to view, a detailed description related to the item including, but not limited to, physical attribute information, technical specifications, nutritional content and promotions offered by the retailer related to the selected item. Upon selection of the consumer review information button 198, the GUI 12 can be advanced to display reviews and ratings of the item submitted by other users who purchased the item for the user to view.

In an exemplary embodiment, the operational input 14b displays information related to an inquiry requested by the retailer, e.g., "Add to Cart", and includes a textual indicator to facilitate user interpretation that an action input by the user to the operational input 14b will "Add to Cart". A single-action user input to the operational input 14b will trigger a command received by the purchasing server 20 to add the item to the electronic shopping cart. In response to the single-action user input, the item information display 190 including the item information and the operational input 14b displayed in the GUI 12 remain unchanged. Thus, the operational input 14b remains at the predefined location in the GUI 12 in response to the single-action user input. However, the textual indicator proximate to the electronic shopping cart button 192 now indicates that the electronic shopping cart now currently includes one (1) item indicative of the selected item, e.g., cereal. Additionally, the operational input 14b displays information related to a new inquiry requested by the retailer, e.g., "Purchase Item", and includes a textual indicator to facilitate user interpretation that an action input by the user to the operation input 14b will "Purchase Item". An additional action input by the user to the operational input 14b will trigger a command received by the purchasing server 20 to provide purchasing information to the mobile computing device. This additional action input by the user includes a double-action user input to the operational input 14b, wherein the first action adds the item to the cart and the second action provides the purchasing information. Hence, the user is not required to go through any process to search for a way to navigate to the electronic shopping cart to purchase the item.

In response to the double-action user input to the operational input 14b, the mobile computing device 10 prompts a screen for a shopping cart display 200. The shopping cart display 200 includes the purchasing information and the operational input 14b. It will be appreciated that the operational input 14b remains at the predefined location in the GUI 12. In an exemplary embodiment, the purchasing information is obtained by the processing device of the purchasing server 20 by receiving a user identifier broadcasted from the mobile computing device in response to the double-action user input and then retrieving the purchasing information from a user database. Thereafter, the processing device generates purchasing display data based on the retrieved purchasing information and transmits the generated purchasing display data to the mobile computing device 10. Accordingly, the transmitted purchasing display data prompts the mobile computing device to display the purchasing information and the operational input in the GUI 12, as illustrated in the shopping cart display 200. In an exemplary embodiment, the purchasing information corresponds to the user and is indicative of information related to shipping information and payment information. It will be appreciated that the purchasing information that is displayed provides enough information so that the user can verify that the purchasing server 20 correctly recognizes the user, but not so much information that sensitive information can be compromised. As illustrated in the shopping cart display 200, the shipping information is indicative of an address preferred by the user to receive the purchased item, e.g., cereal. In one embodiment, the preferred address is previously provided by the user and stored in the user database.

Further, the illustrated payment information is indicative of a payment method by the user to charge the user for the purchased item. For instance, the user may store a credit/debit card number in the user database that can be retrieved by the purchasing server 20 to charge the user for the purchase of the item. It will be appreciated that the user can change the shipping information and/or the payment information displayed in the shopping cart display.

The shopping cart display 200 additionally displays graphical element 202, e.g. button, that displays information related to a numerical value indicating a quantity of each item in the electronic shopping cart. The user can select the quantity button 202 to change the numerical value to increase or decrease the quantity of each item in the electronic shopping cart. For instance, the user may remove an item from the electronic shopping cart by selecting the quantity button 202 and changing the numerical value to "0". As illustrated, the electronic shopping cart only includes the selected item; however, the shopping cart display 200 may display one or more items previously added to the electronic shopping cart. In an exemplary embodiment, the operational input 14b displays information related to a new inquiry requested by the retailer, e.g., "Confirm Purchase", and includes a textual indicator to facilitate user interpretation that an action input by the user to the operational input 14b will "Confirm Purchase" of the item, e.g., or each item previously added to the electronic shopping cart. An additional action input by the user to the operational input 14b will trigger a command received by the purchasing server 20 to complete an order to purchase the item for the user, e.g., or complete an order to purchase the item along with each item previously added to the electronic shopping cart. This additional user input includes a triple-action user input to the operational input 14b, wherein the first action adds the item to the electronic shopping cart, the second action provides the purchasing information via advancing the GUI 12 to the shopping cart display 200, and the third action completes the order to purchase the item for the user, e.g. Confirms Purchase. Accordingly, upon receiving the triple-action user input to the operational input 14b, the purchasing server 20 charges the user using the payment information and ships the product to the user using the shipping information.

Embodiments further include the processing device of the purchasing server generating an electronic receipt when the order has been completed in response to the triple-action user input. The electronic receipt confirms the purchase of the item for the user and any other items that the user purchased that were previously added to the electronic shopping cart when the triple-action user input was performed. The processing device may then transmit the electronic receipt to the mobile computing device 10. The electronic receipt may be attached in an email correspondence in one embodiment. In another embodiment, the electronic receipt may be stored in the user database, and only transmitted to the mobile computing device when the user requests the electronic receipt.

Accordingly, FIG. 4 illustrates a command received by the processing device of the purchasing server 20 in response to a prescribed number of actions input by the user to the operational input, e.g., push button 14b, the command causing the processing device to perform at least one of: (1) add the item to an electronic shopping cart corresponding to the user in response to a single-action user input the operational input; (2) provide purchasing information to the mobile computing device 10 in response to a double-action user input to the operational input; and (3) complete an order to purchase the item for the user in response to a triple-action user input to the operational input. Therefore, a user can use only one graphical element, e.g., operational input 14b, that remains at a predefined location in the GUI 12, to add an item to a cart, purchase the item, and confirm the purchase without the user having to select multiple graphical elements to navigate through various displays to purchase an item.

Figure 5:
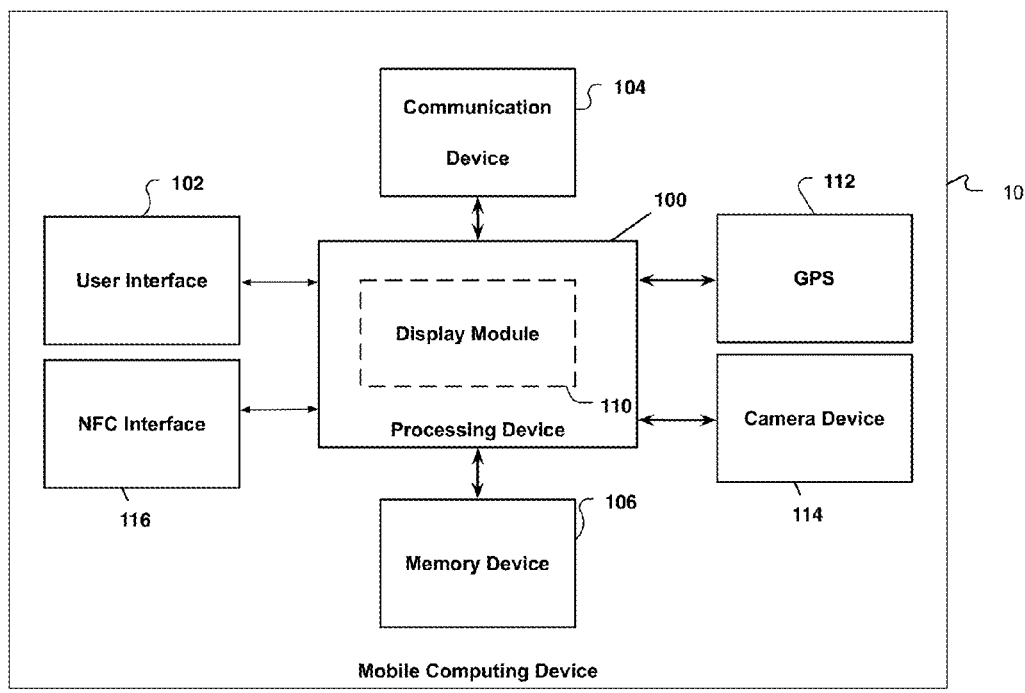
FIG. 5 is a block diagram illustrating components of the mobile computing device of FIG. 1.

Referring now to FIG. 5, a block diagram illustrating example components of the mobile computing device 10 of FIG. 1 is depicted. In the example embodiment, the mobile computing device 10 includes a processing device 100, a user interface 102, a communication device 104, a memory device 106, a GPS device 112, a camera device 114 and a NFC interface 116.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the computing device. In the illustrative embodiment, the processing device 100 also includes a display module 110 for displaying item information, purchasing information, and an operational input transmitted from the purchasing server 20 of FIG. 1. The display module 110 may provide the operational input in the GUI 12 and allow the user to provide the single-action, double-action and triple action user inputs to command the purchasing server 20 to execute one or more operations relating to purchasing the selected item. The display module 110 may additionally display other graphical elements in the GUI 12 allowing the user to select each graphical element through touching or tapping.

The user interface 102 is a device that allows a user to interact with the computing device 10. While one user interface 102 is shown, the term "user interface" can include, but is not limited to, a touch screen, a physical keyboard, a mouse, a microphone, and/or a speaker. The communication device 104 is a device that allows the mobile computing device 10 to communicate with another device, e.g., the purchasing server 20, via the network 30. The communication device 104 can include one or more wireless transceivers for performing wireless communication and/or one or more communication ports for performing wired communication. The memory device 106 is a device that stores data generated or received by the computing device 10. The memory device 106 can include, but is not limited to a hard disc drive, an optical disc drive, and/or a flash memory drive. The memory device 106 can include storage for previously selected items by the user. The GPS device 112 can provide a location of the mobile computing device 10 within the facility. The location of the mobile computing device 10 can be obtained by the purchasing server 20 to track the location of the mobile computing device on a map in relation to nearby facilities furnished by the retailer. Subsequently, the availability information can be obtained by the purchasing server to determine if a selected item is located at facility near the location of the mobile computing device 10. The camera device 114 can be used to scan a barcode corresponding to a product indicated by an item. In one embodiment, camera device 114 can be enabled in response to the user selecting the barcode button 176 displayed in the scan item display 171 of FIG. 2B. The NFC interface 116 can be used to communicate with a product enabled with a NFC device to obtain item information related to the product. In one embodiment, the NFC interface 116 can be enabled in response to the user selecting the NFC button 178 displayed in the scan item display 171 of FIG. 2B.

Figure 6:
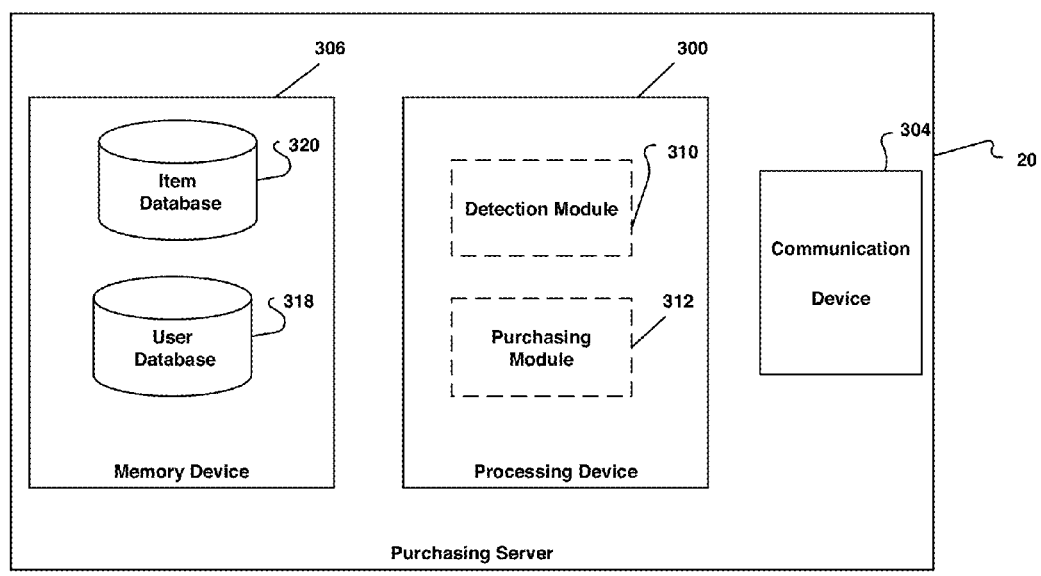
FIG. 6 is a block diagram illustrating components of the purchasing server of FIG. 1.

Referring now to FIG. 6, a block diagram illustrating an exemplary purchasing server 20 is depicted. In an exemplary embodiment, the purchasing server 20 includes a processing device 300, a communication device 304, and memory device 306.

The processing device 300 can include memory, e.g., read only memory (ROM) and random access memory (RAM), storing processor-executable instructions and one or more processors that execute the processor-executable instructions. In embodiments where the processing device 300 includes two or more processors, the processors can operate in a parallel or distributed manner. In the illustrative embodiment, the processing device 300 executes a detection module 310 and a notification module 312, which are described in greater detail below.

The detection module 310 detects when the mobile computing device has selected an item, the item indicating a product offered for sale by the retailer. For instance, the detection module 310 detects the mobile computing device 10 selects the item when an item identifier is received from the mobile computing device 10. The item identifier may be broadcasted via the network 30 of FIG. 1. The facility network may be furnished by the retailer for use within the facility. The mobile computing device 10 can select the item using any of the electronic catalog, the camera device, the NFC interface, manual input, and previously selected items discussed above in the non-limiting examples provided in FIGS. 2A-2B.

The purchasing module 312 obtains item information related to the item selected by the mobile computing device. The purchasing module 312 further generates item display data based on the item information and transmits the generated item display data to the mobile computing device 10. The transmitted item display data prompts the mobile computing device to display the item information and an operational input in the GUI 12 of the mobile computing device. The purchasing module 312 is further configured to receive a command in response to a prescribed number of actions input by the user to the operational input, e.g., button 14b of FIG. 1, the command causing the purchasing module 312 to perform at least one of: (1) add the item to an electronic shopping cart corresponding to the user in response to a single-action user input the operational input; (2) provide purchasing information to the mobile computing device 10 in response to a double-action user input to the operational input; and (3) complete an order to purchase the item for the user in response to a triple-action user input to the operational input.

The communication device 304 is a device that allows the purchasing server 20 to communicate with another device, e.g., the mobile computing device 10, via the network 30. The communication device 304 can include one or more wireless transceivers for performing wireless communication and/or one or more communication ports for performing wired communication.

The memory device 306 is a device that stores data generated or received by the purchasing server 20. The memory device 306 can include, but is not limited to, a hard disc drive, an optical disc drive, and/or flash memory drive. Further, the memory device 306 may be distributed and located at multiple locations. The memory device 306 is accessible to the processing device 300.

An item database 320, or similar structure, can be stored in the memory device 306. In an exemplary embodiment, a retailer maintains the item database 320 to input and store item information for a plurality of items offered for sale by the retailer. For instance, a retailer manager may input item information indicating information such as availability information, description information, pricing information and consumer review information related to an item for storage in the item database 320. The purchasing module 312 retrieves item information stored in the item database 320 for generating item display data to be transmitted to the mobile computing device.

Additionally, a user database 318, or similar structure, can be stored in the memory device 306. In an exemplary embodiment, the retailer maintains the user database 318 to store purchasing information for a plurality of users. The purchasing information is indicative of shipping information and payment information corresponding to a user stored in the user database. The purchasing module 312 retrieves the purchasing information from the user database 318 using a user identifier, e.g., a user name, broadcasted from the mobile computing device 10 in response to a double-action user input to the operational input, e.g., button 14b, displayed in the GUI 12 of FIG. 1. The purchasing module 312 can thereby generate purchasing display data based on the purchasing information retrieved from the user database 318 and transmit the generated purchasing display data to the mobile computing device 10. The transmitted purchasing display data can then prompt the mobile computing device 10 to display the purchasing information and the operation input in the graphical user interface, wherein an action input by the user to the displayed operational input includes the triple-action user input to command the purchasing module 312 to complete the order for the purchase of the item.

The flowchart and block diagrams in the flow diagrams illustrate the architecture, functionality, and operation of possible implementations of methods and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 7:
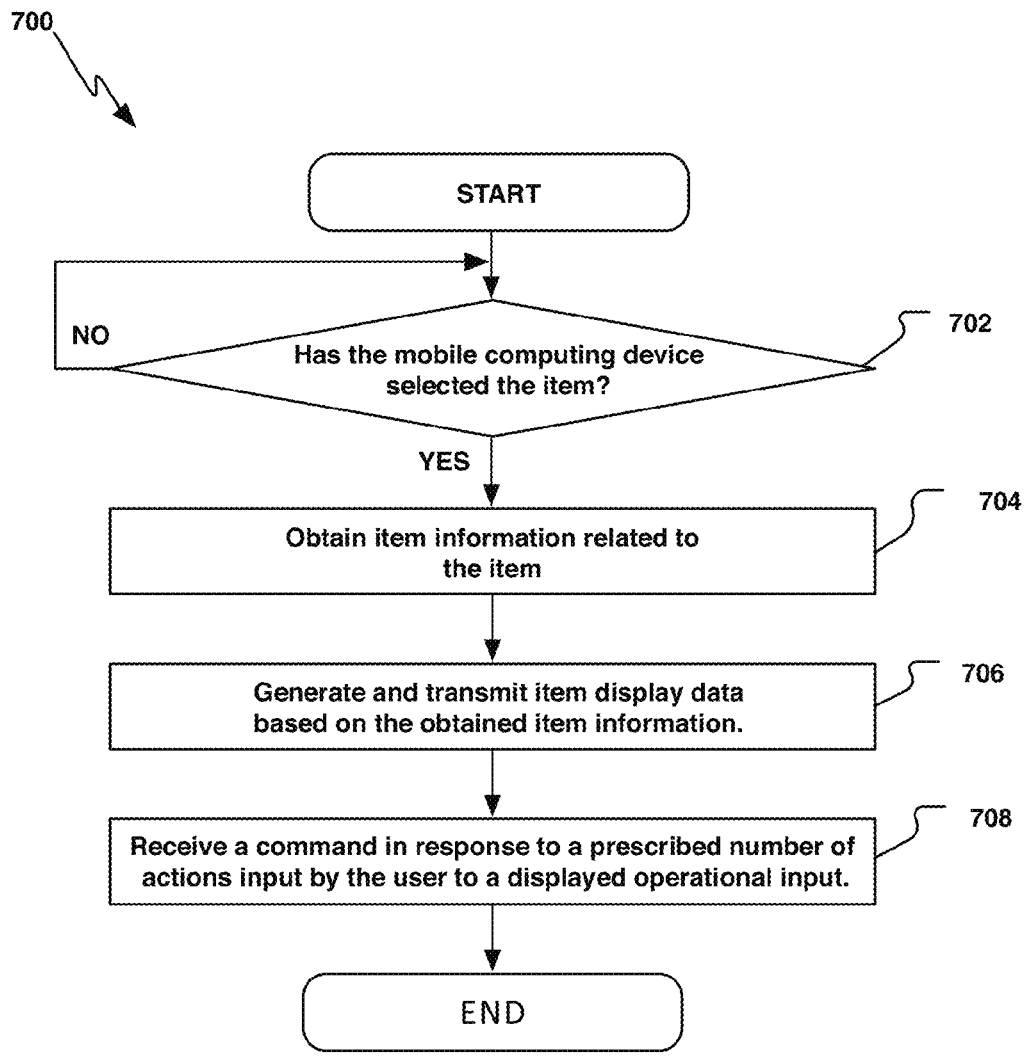
FIG. 7 is a flowchart illustrating an example method for performing one or more operations in response to a prescribed number of actions input by a user to an operational input displayed in a graphical user interface, in accordance the present disclosure.

FIG. 7 illustrates an example method of a flowchart 700 that can be executed by the purchasing server 20 for allowing a mobile computing device corresponding to a user to purchase a product being offered for sale by a retailer. At operation 702, a decision is made whether or not the mobile computing device has selected the item. The detection module 310 detects whether or not the mobile computing device has selected the item. If the mobile computing device has not selected the item, the flowchart 700 iteratively reverts back to decision 702. If the mobile computing device has selected the item, the flowchart 700 iteratively proceeds to operation 704. The mobile computing device can select the item using any of the methods described with reference to the non-limiting examples of FIGS. 2A-2B.

At operation 704, the purchasing module 312 obtains item information related to the item selected by the mobile computing device. As aforementioned, the purchasing module 20 can obtain the item information by receiving an item identifier broadcasted from the mobile computing device and retrieving the item information stored in the item database 320 using the item identifier.

At operation 706, the purchasing module generates item display data based on the obtained item information and transmits the item display data to the mobile computing device. As aforementioned, the transmitted item display data prompts the mobile computing device to display the item information and an operational input in a graphical user interface of the mobile computing device. In an exemplary embodiment, the operational input display information related to an inquiry requested by the retailer, e.g., add item to electronic shopping cart.

At operation 708, the purchasing module 312 receives a command in response to a prescribed number of actions input by the user to the displayed operation input. The command causes the purchasing module 312 to perform one or more operations. For instance, the purchasing module 312 adds the item to an electronic shopping cart in response to an operation input. It will be appreciated that the item information and the operational input remain displayed subsequent to the single-action user input, wherein the operational input remains at a predefined location in the graphical user interface. Additionally, the purchasing module 312 provides purchasing information to the mobile computing device in response to a double-action user input to the operational input. As previously mentioned, the purchasing information corresponds to the user and is indicative of shipping information and payment information. In an exemplary embodiment, the purchasing module 312 obtains the purchasing information by receiving a user identifier in response to the double-action user input and retrieves the purchasing information from the user database 318. Subsequent to the double-action user input, the mobile computing device displays the purchasing information and the operational input, wherein the operational input remains displayed at the predefined location in the graphical user interface. Further, the purchasing module 312 completes an order to purchase the item for the user in response to a triple-action user input to the operational input. It is appreciated that the user need not provide shipping information or payment information when the triple-action user input is performed to complete the order because the purchasing information retrieved from the user database 318 is used to charge the user and ship the product indicated by the item to an address preferred by the user. At operation 708, the purchasing module 312 may additionally generate an electronic receipt when the order has been completed and transmit the electronic receipt to the mobile computing device.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer-implemented method of operating a purchasing server including a processing device using a mobile computing device corresponding to a user, comprising:

providing an item purchasing application for installation on a mobile computing device to enable communication between the mobile computing device and a purchasing server;

receiving, at the purchasing application via the mobile computing device, a request to select an item and displaying a plurality of item selection icons on a graphical user interface displayed on a touchscreen of the mobile computing device indicating corresponding selection operations including an operation to scan an item identifier corresponding to the item and an operation to select the item from an electronic catalogue;

initiating, by the item purchasing application, the operation to scan an item identifier upon receiving a user input of the corresponding item selection icon using the touchscreen;

receiving, by the mobile computing device, a near field communication signal including an item identifier corresponding to a product at a currently stocked location within a facility furnished by the retailer;

transmitting, by the mobile computing device, a notification including the item identifier to the processing device of the purchasing server;

receiving, by the processing device of the purchasing server, the notification including to the item identifier from the mobile computing device indicating the mobile computing device has selected the item indicating the product;

obtaining, by the processing device, item information related to the item;

generating, by the processing device, item display data based on the item information;

transmitting, by the processing device, the item display data to the mobile computing device, the item display data prompting the mobile computing device to display the item information and an operational input in the graphical user interface of the mobile computing device, the operational input having an associated image being displayed at a predefined location within the graphical user interface, the associated image and a functioning of the operational input being modified after a selection of the operational input by the user, the associated image being initially displayed with a first image;

receiving, by the processing device, a command in response to a prescribed number of actions input by the user to the operational input using the touchscreen of the mobile computing device, the command causing the processing device to perform:

a. in response to a single-action user input to the operational input, add the item to an electronic shopping cart corresponding to the user and modify the associated image to a second image that is different from the first image;

b. in response to a double-action user input to the operational input, receiving a unique user ID from the mobile computing device, retrieve a user account associated with the unique user ID from a database, display purchasing information included in the retrieved user account on the mobile computing device, and modify the associated image to display a third image the is different from the second image, the purchasing information corresponding to the user; and c. in response to a triple-action user input to the operational input, complete an order to purchase the item for the user.

2. The computer-implemented method of claim 1, wherein the further comprising:

initiating the operation to scan an item identifier including displaying a plurality of scanning icons including a first scanning icon associated with an operation to scan a barcode corresponding to the item and a second item selection icon associated with an operation to receive a near field communication signal including an item identifier corresponding to the item; and initiating the operation to scan a barcode corresponding to the product using a camera device of the mobile computing device upon receiving a user selection of the first item selection icon; and initiating the operation to receive a near field communication signal including an item identifier corresponding to the product upon receiving a user selection of the second item selection icon.

3. The computer-implemented method of claim 1, wherein obtaining the item information includes:

receiving, at the processing device, the item identifier broadcasted from the mobile computing device when the item is selected; and retrieving, at the processing device, the item information from an item database, the item database storing item information for a plurality of items.

4. The computer-implemented method of claim 3, wherein the item information is indicative of any combination of pricing information, availability information, description information and consumer review information related to the item and stored in the item database.

5. The computer-implemented method of claim 1, wherein the item information and the operational input remain displayed in the graphical user interface in response to the single-action user input.

6. The computer-implemented method of claim 1, wherein the purchasing information is provided to the mobile computing device by:

receiving, at the processing device, in response to the double-action user input, a user identifier broadcasted from the mobile computing device;

retrieving, at the processing device, the purchasing information from a user database, the user database storing purchasing information for a plurality of users;

generating, at the processing device, purchasing display data based on the retrieved purchasing information; and transmitting, at the processing device, the purchasing display data to the mobile computing device, the purchasing display data prompting the mobile computing device to display the purchasing information and the operational input in the graphical user interface, wherein an action input by the user to the displayed operational input comprises the triple-action user input to command the processing device to complete the order for purchase of the item.

7. The computer-implemented method of claim 6, wherein the transmitting the purchasing display data to the mobile computing device further prompts the mobile computing device to display one or more items previously added to the electronic shopping cart, wherein the triple-action user input further commands the processing device to complete the order for the purchase of the item and the one or more items previously added to the electronic shopping cart.

8. The computer-implemented method of claim 6, wherein the purchasing information is indicative of information related to shipping information and payment information corresponding to the user that is stored in the user database, the shipping information being indicative of an address preferred by the user to receive the purchased item and the payment information being indicative of a payment method preferred by the user to charge the user for the purchased item.

9. The computer-implemented method of claim 1, wherein the operational input remains at the predefined location in response to the single-action user input and the double-action user input.

10. The computer-implemented method of claim 1, further comprising:
generating, at the processing device, an electronic receipt when the order has been completed in response to the triple-action user input, the electronic receipt confirming the purchase of the item by the user; and
transmitting, at the processing device, the electronic receipt to the mobile computing device.

11. A purchasing server for using a mobile computing device corresponding to a user, comprising:
a processor including:
a detection module that:
receives, from the mobile computing device, a request to select an item and prompts the mobile computing device to display a plurality of item selection icons in a graphical user interface displayed on a touchscreen of the mobile computing device indicating corresponding selection operations including an operation to scan an item identifier corresponding to the item and an operation to select the item from an electronic catalogue;
initiates the operation to scan an item identifier upon receiving a user input of the corresponding item selection icon using the touchscreen and receives a near field communication signal including an item identifier corresponding to a product at a currently stocked location within a facility furnished by the retailer; and
receives a notification including to the item identifier indicating the mobile computing device has selected the item indicating the product; and
a purchasing module that:
obtains item information related to the item;
generates item display data based on the item information;
transmits the item display data to the mobile computing device, the item display data prompting the mobile computing device to display the item information and an operational input in the graphical user interface of the mobile computing device, the operational input having an associated image being displayed at a predefined location within the graphical user interface, the associated image and a functioning of the operational input being modified after each selection of the operational input by the user, the associated image being initially displayed with a first image;
receives a command in response to a prescribed number of actions input by the user to the operational input using the touchscreen of the mobile computing device, the command causing the purchasing module to perform:
a. in response to a single-action user input to the operational input, add the item to an electronic shopping cart corresponding to the user and modify the associated image to a second image that is different from the first image;
b. in response to a double-action user input to the operational input, receive a unique user ID from the mobile computing device, retrieve a user account associated with the unique user ID from a database, display purchasing information included in the retrieved user account on the mobile computing device, and modify the associated image to display a third image the is different from the second image, the purchasing information corresponding to the user, and
c. in response to a triple-action user input to the operational input, complete an order to purchase the item for the user.

12. The purchasing server of claim 11, wherein the detection module:
initiates the operation to scan an item identifier corresponding to the item including displaying a plurality of scanning icons including a first scanning icon associated with an operation to scan a barcode corresponding to the product and a second item selection icon associated with an operation to receive a near field communication signal including an item identifier corresponding to the product; and
initiates the operation to scan a barcode corresponding to the product using a camera device of the mobile computing device upon receiving a user selection of the first item selection icon; and
initiates the operation to receive a near field communication signal including an item identifier corresponding to the product upon receiving a user selection of the second item selection icon.

13. The purchasing server of claim 11, wherein the purchasing module obtains the item information by:
receiving, at the detection module, the item identifier broadcasted from the mobile computing device when the item is selected; and
retrieving the item information from an item database, the item database storing item information for a plurality of items.

14. The purchasing server of claim 13, wherein the item information is indicative of any combination of pricing information, availability information, description information and consumer review information related to the item and stored in the item database.

15. The purchasing server of claim 11, wherein the item information and the operational input remain displayed in the graphical user interface in response to the single-action user input.

16. The purchasing server of claim 11, wherein the purchasing module provides the purchasing information to the mobile computing device by:
receiving, in response to the double-action user input, a user identifier broadcasted from the mobile computing device;
retrieving the purchasing information from a user database, the user database storing purchasing information for a plurality of users;
generating purchasing display data based on the retrieved purchasing information; and
transmitting the purchasing display data to the mobile computing device, the purchasing display data prompting the mobile computing device to display the purchasing information and the operational input in the graphical user interface, wherein an action input by the user to the displayed operational input comprises the triple-action user input to command the purchasing module to complete the order for purchase of the item.

17. The purchasing server of claim 16, wherein the transmitting the purchasing display data to the mobile computing device further prompts the mobile computing device to display one or more items previously added to the electronic shopping cart, wherein the triple-action user input further commands the processing device to complete the order for the purchase of the item and the one or more items previously added to the electronic shopping cart.

18. The purchasing server of claim 16, wherein the purchasing information is indicative of information related to shipping information and payment information corresponding to the user that is stored in the user database, the shipping information being indicative of an address preferred by the user to receive the purchased item and the payment information being indicative of a payment method preferred by the user to charge the user for the purchased item.

19. The purchasing server of claim 11, wherein the operational input remains at the predefined location in response to the single-action user input and the double-action user input.

20. The purchasing server of claim 11, wherein the purchasing module is further configured to:
   generate an electronic receipt when the order has been completed in response to the triple-action user input, the electronic receipt confirming the purchase of the item by the user; and
   transmit the electronic receipt to the mobile computing device.

* * * * *